(12) United States Patent
Ilsen et al.

(10) Patent No.: US 11,444,725 B2
(45) Date of Patent: Sep. 13, 2022

(54) TRANSMISSION OF REDUNDANCY DATA IN A HYBRID NETWORK SYSTEM

(71) Applicant: TDF, Montrouge (FR)

(72) Inventors: Stefan Ilsen, Braunschweig (DE);
Frieder Juretzek, Braunschweig (DE);
Lucca Richter, Braunschweig (DE);
Daniel Rother, Hannovre (DE); Fabian Schrieber, Braunschweig (DE)

(73) Assignee: TDF, Montrouge (FR)

( * ) Notice: Subject to any disclaimer, the term of this patent is extended or adjusted under 35 U.S.C. 154(b) by 169 days.

(21) Appl. No.: 16/486,090

(22) PCT Filed: Feb. 14, 2018

(86) PCT No.: PCT/EP2018/053720
§ 371 (c)(1),
(2) Date: Aug. 14, 2019

(87) PCT Pub. No.: WO2018/149891
PCT Pub. Date: Aug. 23, 2018

(65) Prior Publication Data
US 2020/0059326 A1 Feb. 20, 2020

(30) Foreign Application Priority Data
Feb. 17, 2017 (EP) .................................. 17305183

(51) Int. Cl.
*H04L 1/18* (2006.01)
*H04L 1/00* (2006.01)
(Continued)

(52) U.S. Cl.
CPC ............ *H04L 1/1812* (2013.01); *H04L 1/009* (2013.01); *H04L 1/1867* (2013.01); *H04L 67/02* (2013.01); *H04W 4/06* (2013.01)

(58) Field of Classification Search
CPC ....... H04L 1/1812; H04L 1/009; H04L 67/12; H04L 1/1867; H04W 4/06
See application file for complete search history.

(56) References Cited

U.S. PATENT DOCUMENTS 5,987,432 A * 11/1999 Zusman ................. G06Q 40/00
705/35
9,648,631 B1 * 5/2017 Sevindik ............... H04L 1/1812
(Continued)

FOREIGN PATENT DOCUMENTS

WO   WO-2012/085543 A1   6/2012
WO   WO-2016/120215 A1   8/2016

OTHER PUBLICATIONS

International Preliminary Reporton Patentability for corresponding International Application No. PCT/EP2018/053720 dated Aug. 20, 2019.

(Continued)

*Primary Examiner* — Parth Patel
(74) *Attorney, Agent, or Firm* — Faegre Drinker Biddle & Reath LLP

(57) ABSTRACT

The invention relates to a method for transmitting redundancy data in an hybrid broadband/broadcast network system comprising a broadcast network dedicated to transmission of broadcast services and a broadband network dedicated to transmission of at least unicast services, the method being carried out in at least one network entity and comprising the following steps: —selecting (42) a transmission mode for transmitting redundancy data among a plurality of transmission modes supported by the broadband network; —obtaining (43) redundancy data, said redundancy data comprising information for decoding broadcast services broadcasted by the broadcast network; —transmitting (44), via at least one node of the broadband network, the (Continued)

obtained redundancy data according to the selected transmission mode.

13 Claims, 4 Drawing Sheets

(51) Int. Cl.
*H04L 67/02* (2022.01)
*H04W 4/06* (2009.01)

(56) References Cited

U.S. PATENT DOCUMENTS

| | | | | |
|---|---|---|---|---|
| 9,729,486 B2* | 8/2017 | Kang | | H04L 12/1845 |
| 11,115,335 B2* | 9/2021 | Yamagishi | | H04L 47/19 |
| 2007/0174885 A1* | 7/2007 | Hus | | H04L 1/1607 |
| | | | | 725/105 |
| 2008/0165766 A1* | 7/2008 | Synnergren | | H04L 47/10 |
| | | | | 370/352 |
| 2010/0235702 A1* | 9/2010 | Tanimoto | | H04L 1/1887 |
| | | | | 714/748 |
| 2012/0008545 A1* | 1/2012 | Zhang | | H04L 1/1829 |
| | | | | 370/315 |
| 2012/0224549 A1* | 9/2012 | Myers | | H04L 27/233 |
| | | | | 370/329 |
| 2013/0343259 A1* | 12/2013 | Barrett | | H04L 1/0041 |
| | | | | 370/312 |
| 2015/0236818 A1 | 8/2015 | Qi et al. | | |
| 2015/0280861 A1 | 10/2015 | Qi et al. | | |
| 2015/0334488 A1* | 11/2015 | Kim | | H04W 4/06 |
| | | | | 381/2 |
| 2015/0381381 A1* | 12/2015 | Dyson | | H04W 24/08 |
| | | | | 370/312 |
| 2016/0261665 A1* | 9/2016 | Stockhammer | | H04N 21/8456 |
| 2018/0013516 A1* | 1/2018 | Zoellner | | H04H 60/11 |
| 2020/0059326 A1* | 2/2020 | Ilsen | | H04L 67/02 |

OTHER PUBLICATIONS

International Search Report and Written Opinion, corresponding International Application No. PCT/EP2018/053720, dated May 8, 2018.

EBU Operating Eurovisioin and Euroradio: TR 027 "Delivery of Broadcast Content Over LTE Networks" Technical Report, Jul. 1, 2014.

DVB Technical Module "TM-CSU Draft Study Mission Report v2.0" Dec. 20, 2013.

* cited by examiner

TRANSMISSION OF REDUNDANCY DATA IN A HYBRID NETWORK SYSTEM

CROSS REFERENCE TO RELATED APPLICATIONS

This application is the U.S. National Phase of International Patent Application No. PCT/EP2018/053720 filed Feb. 14, 2018, which claims the benefit of priority of European Patent Application No. 17305183.0 filed on Feb. 17, 2017, the respective disclosures of which are each incorporated herein by reference in their entireties.

The present invention generally relates to the transmission of redundancy data and in particular in the context of a hybrid broadcast/broadband network.

It finds application, in particular while not exclusively, in systems that enable to offload broadcast services from a cellular network, such as an LTE mobile network, in particular LTE-Advanced, which is initially dedicated to unicast services, to an existing broadcast network. Such networks aim in particular at relieving mobile networks by offloading broadcast contents, such as video contents, to existing High Tower, High Power (HTHP) transmitters of broadcast networks. This system is hereafter called Tower Overlay over LTE-Advanced+, TOoL+.

LTE-Advanced describes the latest evolution of cellular transmission standards developed by the 3GPP (Third Generation Partnership Project).

For example, when LTE-A broadcast data are offloaded to HTHP transmitters, the data transmitted by the HTHP transmitters can be referred to as LTE-A+ data.

However, transmission of broadcast data via HTHP transmitters is known not to be error-free and errors can lead to the impossibility to decode transmitted data. Also, errors can occur in a channel, for example because of insufficient network coverage.

To overcome these shortcomings, in classical networks (non-hybrid networks such as LTE-A networks), additional redundant data can be requested and transmitted, and a receiver can use the redundant data to correct previously received corrupted payload.

A solution has also been proposed for a DVB-T2 network, by using a broadband/broadcast hybrid system. This solution is disclosed in documents US 2015/0280861 and US 2015/0236818. These documents propose to transmit redundant data via a Redundancy on Demand, RoD, server via broadband, the redundant data being used to correct data that has been initially broadcasted via DVB-T2 transmitters.

RoD currently enables to supply data on demand to broadcast receivers which suffer from insufficient network coverage and would not be able to decode the broadcast signal without RoD.

However, this solution relies on an additional broadband network for transmitting RoD data. It also lacks flexibility and has an impact on latency because it only proposes to transmit RoD data in unicast to requesting receivers.

The present invention aims at improving the situation.

A first aspect of the invention concerns a method for transmitting redundancy data in an hybrid broadband/broadcast network system comprising a broadcast network dedicated to transmission of broadcast services and a broadband network dedicated to transmission of at least unicast services, the method being carried out in at least one network entity and comprising the following steps:

selecting a transmission mode for transmitting redundancy data among a plurality of transmission modes supported by the broadband network;

obtaining redundancy data, the redundancy data comprising information for decoding broadcast services broadcasted by the broadcast network;

transmitting, via at least one node of the broadband network, the obtained redundancy data according to the selected transmission mode.

Selection of a transmission mode for redundancy data among several transmission modes improves the flexibility associated with the transmission of redundancy data. No restriction is attached to the criterion or criteria that is/are used to select the transmission mode: for example, a broadband network load, a number of received requests for redundancy data or any indicator received from another network entity can be taken into account when selecting the transmission mode for redundancy data. No restriction is also attached to the obtaining of redundancy data. For example, the redundancy data can depend on the selected transmission mode or can be independent thereon. The at least one entity can encompass the node of the broadband network transmitting the obtained redundancy data, or a server, or a combination thereof.

According to some embodiments of the invention, the broadband network is an LTE-A network and the broadcast network is configured to transmit LTE-A broadcast services, named LTE-A+ services.

As explained above, the hybrid network system is therefore a TOoL+. This is advantageous as this system is natively hybrid, so that cooperation between the broadband network and the broadcast network is enhanced.

According to some embodiments, the plurality of transmission modes comprises at least one unicast transmission mode and at least one broadcast transmission mode.

The flexibility enabled by these transmission modes enable to alternate between a resource efficient mode (via broadcast) and a robust mode (via unicast), depending on different criteria that can be taken into account when selecting the transmission mode for redundancy data.

In complement, upon selection of one of the at least one broadcast transmission mode, the redundancy data can be broadcasted via evolved Multimedia Broadcast Multicast Service, eMBMS.

Using a broadcast transmission mode for redundancy data enables to reduce the quantity of redundancy data transmitted, compared to unicast transmissions of redundancy data. The use of eMBMS also enables to take advantage of existing broadcast carriers of LTE-A.

According to some embodiments, the transmitted redundancy data can depend on the selected transmission mode.

This enables to determine both redundancy data and the way it is transmitted using a single selection.

According to some embodiments, the plurality of transmission modes can comprise at least an Hybrid Automatic Repeat Request (HARM) mode according to LTE-A.

This enables to take advantage, in the network system, of existing functionalities enabled by the LTE-A broadband network.

According to some embodiments, the plurality of transmission modes comprises at least one Redundancy on Demand, RoD, mode according to which a quantity of redundancy data is only a fraction of a quantity of the payload data of the broadcast services.

This enables to reduce the quantity of redundancy data to be transmitted, compared to the HARQ mode, while still enabling the user equipments to decode the broadcast services efficiently.

As a complement, the at least one RoD mode can comprise a pre-emptive RoD mode, according to which the redundancy data can be obtained according to a predetermined rule and the redundant data can be broadcasted by the at least one node of the broadband network.

Transmitting redundancy data that is selected according to a predetermined rule enables to perform transmission of redundancy data, by the broadband network, in parallel to the broadcasting of broadcast services (for which the redundancy data is transmitted) by the broadcast network, as it does not require to know which data and which amount of redundancy data is required. The reactivity of the redundancy data transmission method is therefore improved. The predetermined rule might for example be to select bits of the original broadcast transmission, that are the least significant bits (LSBs), or to select bits that are spread evenly within the transmission spectrum so as to mitigate fading effects. The amount of redundancy data can also be predetermined.

Alternatively or in complement, the method can further comprise receiving, by the at least one node, at least one request for redundancy data originating from at least one user equipment.

This enables to efficiently select redundancy data and/or a transmission mode.

For example, the transmission mode can be selected based on a number of requests for redundancy data received by the at least one node.

It is particularly advantageous to select a transmission mode between a broadcast mode and a unicast mode. For example, when the number of requests for redundancy data overwhelms a predefined threshold for a coverage area of a given node, or for the whole broadband network, a broadcast transmission mode can be preferred.

Alternatively or in complement, each request for redundancy data received from a given user equipment can comprise the following elements:
  information related to the amount of required redundancy data;
  an identifier of the requested data, for example an identifier of a Forward Error Coding, FEC, frame; and
  a location identifier of the given user equipment.

And the redundancy data can be obtained based on at least one of the above elements.

This improves the efficiency of the redundancy data as they specifically address the need of the user equipment(s). On average, the amount of redundancy data is decreased and the load of the broadband network is therefore decreased.

According to some embodiments, the at least one RoD mode can comprise a unicast RoD mode, and, upon selection of the unicast RoD mode, the portion of payload can be transmitted to the at least one user equipment in unicast by the at least one node of the broadband network.

The unicast RoD transmission mode is both efficient in terms of resources as it transmits less redundancy data than HARQ, and both robust for the requesting user equipment because it is unicast.

According to some embodiments, the at least one RoD mode can comprise a common RoD mode, and, upon selection of the common RoD mode, the portion of payload can be broadcasted by the at least one node of the broadband network.

This mode is particularly efficient in releasing the broadband network load while providing redundancy data to user equipments. As detailed hereafter, the common RoD mode may encompass a random (or predetermined) approach and a waterfilling approach.

A second aspect of the invention concerns a computer program comprising code instructions to implement the method according to the first aspect of the invention when said instructions are run by a processor.

A third aspect of the invention concerns a hybrid broadband/broadcast network system comprising a broadcast network dedicated to transmission of broadcast services and a broadband network dedicated to transmission of at least unicast services, the system comprising at least one network entity comprising a processor configured for:
  selecting a transmission mode for transmitting redundancy data among a plurality of transmission modes supported by the broadband network;
  obtaining redundancy data, said redundancy data comprising information for decoding broadcast services broadcasted by the broadcast network;
and at least one node of the broadband network being configured for transmitting the obtained redundancy data according to the selected transmission mode.

A fourth aspect of the invention concerns user equipment comprising:
  a first interface for receiving data (for example frames, or FEC frames, as detailed hereafter) of a broadcast service broadcasted by a broadcast network;
  at least one unit configured to decode the data of the broadcast services received by the first interface;
  a second interface for communicating with at least one node of a broadband network;
  a processor configured for:
  detecting that the at least one unit fails to decode said data;
  determining an information relating to an amount of required redundancy data;
  generating a request for redundancy data identifying the at least one frame and comprising the information relating to an amount of required redundancy data; and
  forwarding redundancy data received by the second interface to the at least one unit.

The present invention is illustrated by way of example, and not by way of limitation, in the figures of the accompanying drawings, in which like reference numerals refer to similar elements and in which.

Figure 1:
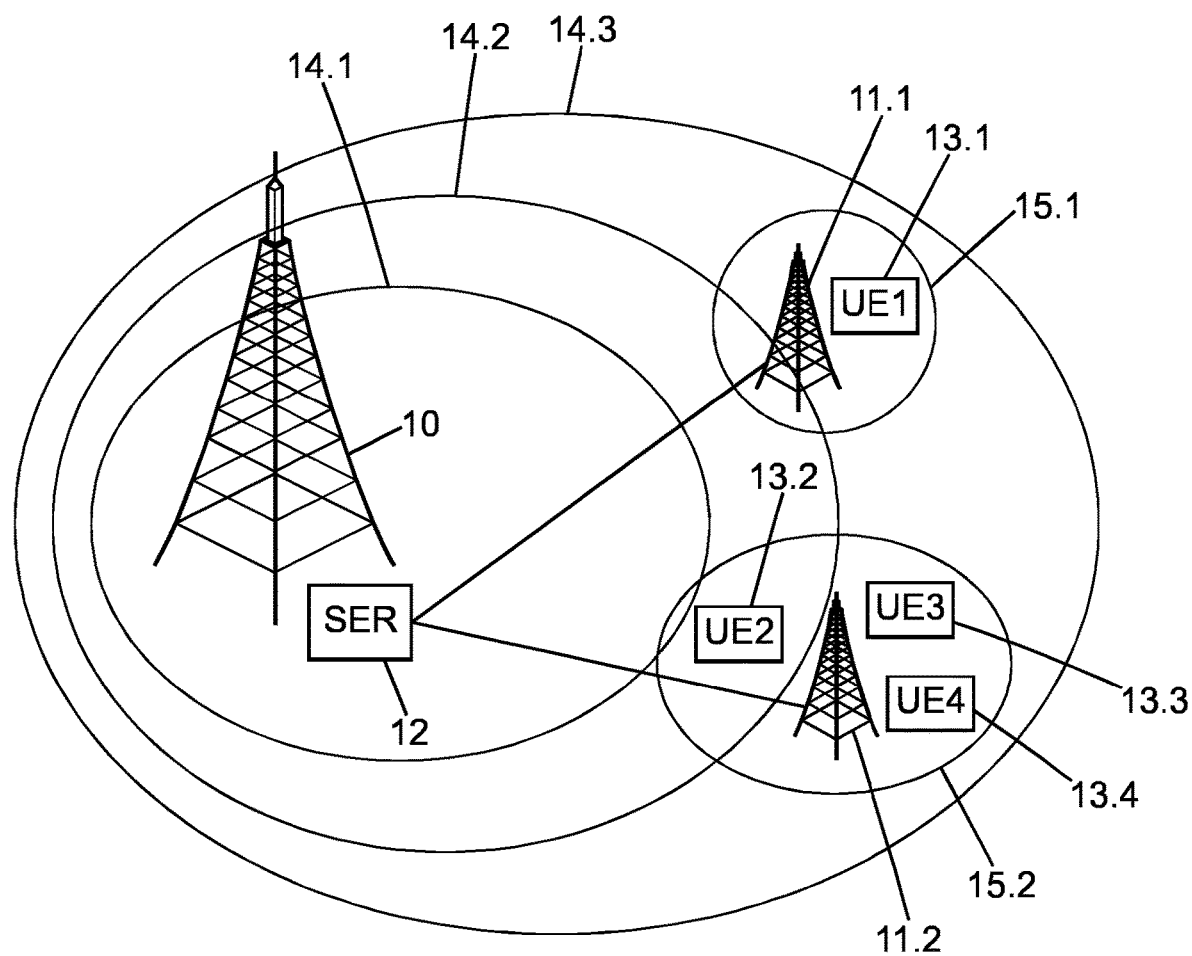
FIG. 1 illustrates a network system according to some embodiments of the invention.

Referring to FIG. 1, there is shown a Tower Overlay over LTE-A+ system, called TOoL+ system, which comprises a HTHP transmitter 10 of a broadcast network having a first coverage area 14, and several nodes 11.1 and 11.2 of a broadband network, such as an LTE-A mobile broadband network, the nodes 11.1 and 11.2 having respective second coverage areas 15.1 and 15.2. Nodes 11.1 and 11.2 can be base stations, which are called eNodeBs under LTE-A specifications.

As shown on FIG. 1, the first coverage area can comprise several sub-areas 14.1-14.3, which may be associated with different reception qualities for the user equipment receiving the broadcast services issued from the HTHP transmitter 10.

LTE-A+ designates transmission of LTE-A services via the HTHP transmitter 10. These services can be received and decoded by any receiver having a LTE-A decoding unit and an antenna for demodulating signals transmitted by the HTHP transmitter 10.

The example of a TOoL+ system is considered hereafter, for illustrative purposes. However, the invention applies to any hybrid broadband/broadcast network system and is not restricted to the TOoL+ system.

A broadcast network designates a network, which is originally designed to be dedicated to services other than unicast services, such as broadcast or multicast services.

The principle of Tower Overlay over LTE-A+, TOoL+, is to offload data originally transmitted through broadband networks, such as LTE networks, especially live video or other popular contents, to broadcast networks, for example networks initially dedicated to broadcast television services.

Therefore, LTE-A broadcast services that were originally transmitted by the mobile network, using evolved Multimedia Broadcast Multicast Service, eMBMS, for example, can be transmitted by a HTHP transmitter 10 instead of an eNodeB 11.1-11.2 of the LTE-A mobile broadband network.

Figure 2:
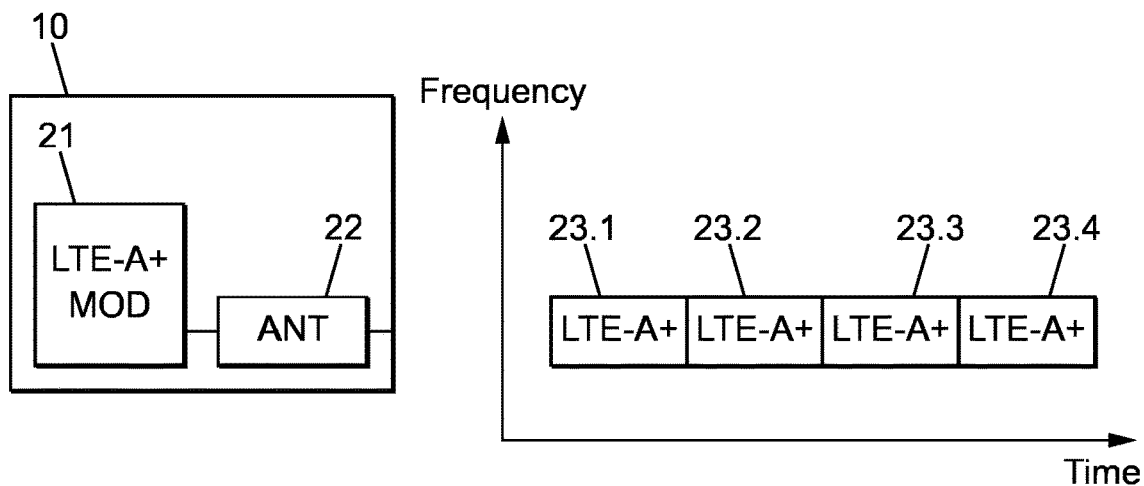
FIG. 2 represents a HTHP transmitter according to a first scenario.
Figure 3:
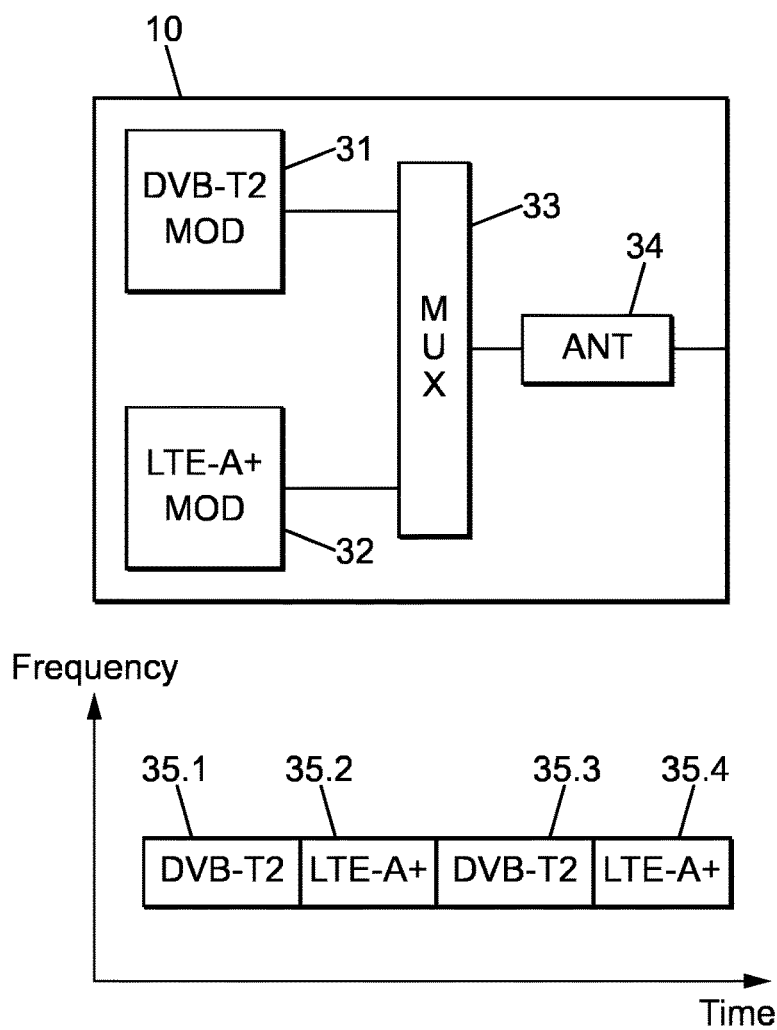
FIG. 3 represents a HTHP transmitter according to a second scenario.

The hybrid network system noted TOoL+ hereafter, encompasses at least two HTHP scenarios that are illustrated on FIGS. 2 and 3.

According to a first scenario that is illustrated on FIG. 2, the broadcast network comprising the HTHP transmitter 10 carries LTE-A+ broadcast services only. In that case, the HTHP transmitter 10 comprises a LTE-A+ modulator 21 and an antenna 22. The LTE-A+ modulator 21 is arranged to receive data, such as video data or audio data, to be encoded in a format that satisfies the LTE-A specifications.

In that example, all the time-frequency resources of the HTHP transmitter 10 are dedicated to the transportation of LTE-A+ broadcast content and control data, thereby addressing all user equipments that are compatible with the LTE-A specifications and within the first coverage area 14. Therefore, the antenna 22 broadcasts only LTE-A+ frames 23.1-23.4 in the first coverage area 14.

According to a second scenario that is illustrated on FIG. 3, the broadcast network carries both LTE-A+ broadcast services and DVB-T2 services.

To this end, the HTHP transmitter 10 comprises an LTE-A+ modulator 32 and a DVB-T2 modulator 31. The LTE-A+ modulator 32 is arranged to transmit data, such as video data or audio data, encoded in a format that satisfies the LTE-A+ specifications. The DVB-T2 modulator 31 is arranged to transmit data, usually video data, encoded in a format that satisfies the DVB-T2 specifications.

The HTHP transmitter 10 may also comprise a multiplexer 33 to multiplex the data issued from the modulators 31 and 32 and to transmit the multiplexed data to an antenna 34.

For example, and as shown on FIG. 3, the data issued from the modulators 31 and 32 can be time-multiplexed, so that one or several DVB-T2 frames 35.1 and 35.3 are alternated with one or several LTE-A+ frames 35.2 and 35.4 when broadcasted by the antenna 34 in the first coverage area 11.

A single antenna 34 has been shown on FIG. 3. However, the invention is not restricted to this example and also encompasses the case where an antenna is dedicated to each of the modulators 31 and 32. In that case, the antennas need to be synchronized so as to ensure that the LTE-A+ frames and the DVB-T2 frames are timely alternated.

Of course, the HTHP transmitter 10 shown on FIG. 3 can also be used in the first scenario, and can alternate between the first and second scenarios upon demand. In addition, the HTHP transmitter 10 can alternate between more than two different services, or can alternate between services other than LTE-A+ and DVB-T2.

Referring back to FIG. 1, User Equipments, UE, 13.1-13.4 are configured for receiving and decoding broadcast service data, such as LTE-A+ data, transmitted by the HTHP transmitter 10, provided they are located within the first coverage area 14.

However, within the first coverage area 14, several sub-areas 14.1-14.3 are associated with different coverage levels that generally decrease while the distance from the HTHP transmitter 10 increases.

For example, UEs 13.1, 13.3 and 13.4 are more distant from the HTHP transmitter 10 than UE 13.2, and errors are more likely to occur on the broadcast channel. This can lead to the impossibility for these UEs to decode the broadcast services (at least some of the frames, also referred to FEC frames hereafter, for Forward Error Correction frames).

The invention therefore proposes to use RoD and/or HARQ in a flexible manner within a hybrid broadband/broadcast system. To this end, the system comprises an RoD server 12 that is configured for providing redundancy data to be transmitted to the UEs that receive the broadcast services from the HTHP transmitter 10.

RoD can be used to increase both the Quality of Service (QoS) for UEs and the overall network system performance:
- to enable successful decoding of the transmitted data within the UEs, only a fraction of the original payload data rate may be required, providing a reduction of the transmitted redundancy data rate compared to HARQ. Indeed, according to HARQ, the whole payload is generally transmitted as redundancy data;
- RoD can be used on the physical layer and therefore allows for a very low transmission overhead;
- a preemptive transmission of redundancy data allows reducing the delay in decoding the broadcast services (see the pre-emptive RoD transmission mode described hereafter); and
- the extension of the first coverage area 14 enabled by the use of RoD can be used to adapt the network planning of the broadcast network itself, for example decreasing the transmission power and therefore reducing the operational costs.

At least some of these advantages will be further described hereafter.

Up to now, RoD was applied to a combination of independent networks, namely a broadcast network and an additional broadband connection dedicated to supporting the broadcast network.

As TOoL+ is natively a combination of broadcast and broadband technologies, this allows for an enhanced interaction and network optimization when choosing an optimal transmission mode for redundancy data. Inherently, TOoL+ can allow for a transmission of corrupt payload data via HARQ using a regular LTE Unicast connection on a given carrier. The redundancy data transmitted via HARQ can originate from the RoD server 12 and can be requested by the node 11.1-11.2 serving the requesting UE 13.1-13.4.

According to the invention, the same carrier can also be used to transmit additional RoD redundancy data. To enable the implementation of RoD for TOoL+, some embodiments of the invention are based on the following prerequisites:
redundancy data is available for the serving eNodeBs 11.1 and 11.2. This can be enabled by the centralized RoD server 12 as illustrated on FIG. 1. Alternatively, the eNodeBs can have internal storage mediums for storing redundancy data and receiving means for receiving updates for updating the redundancy data;

each UE 13.1-13.4 is able to identify not only the corrupt payload data, but also the corresponding frame, or the corresponding FEC frame in the example detailed hereafter;

either the UEs 13.1-13.4 or the eNodeBs 11.1-11.2 (based on signal quality reports, such as CQI for example) can calculate the amount of required additional redundancy data.

According to the invention, at least one network entity (the RoD server 12, the eNodeB, or a combination of the RoD server and the eNodeB) can select a transmission mode for redundancy data, among a plurality of retransmission modes. The plurality can comprise a HARQ transmission mode and at least one RoD transmission mode. The transmission mode can define:

the redundancy data, its amount and nature (whole payload, only a fraction of it, additional extrinsic information, or more generally any information that enables to improve the decoding of the broadcast services by the UE); or the way the redundancy data is transmitted (for example broadcast or unicast); or a combination thereof.

In the present application, the wording "RoD" does not restrict the RoD redundancy data to redundancy data that is sent in response to a request for redundancy data by a UE. "RoD" actually defines the amount and nature of the redundancy data that is transmitted: as explained above, only a fraction of the payload data is transmitted, contrary to the HARQ transmission mode, and examples of redundancy data according to RoD will be given hereafter (QAM constellation points or extrinsic information). RoD however does not limit the transmission modes to modes that are triggered by a UE request for redundancy data. As explained hereafter, a pre-emptive RoD transmission mode defines transmission of redundancy data that is obtained according to a predetermined rule, without the need to receive requests for redundancy data from UEs.

According to the RoD transmission mode(s), the redundancy data can for example be the least robust information provided by QAM (Quadrature Amplitude Modulation) constellation points of the original encoded data (the broadcast services broadcasted by the HTHP transmitter 10). According to another embodiment, the redundancy data for the RoD transmission mode(s) can be additional extrinsic information, in particular when Turbo Codes are used as FEC, which is the case for LTE-A (whereas Low Density Parity-check Code, LDPC, is used for DVB-T2). The additional extrinsic information can support the decoding process by the UE of the received QAM symbols, instead of replacing them. Therefore, according to the RoD transmission mode(s), a quantity of redundant data is only a fraction of (is less than) a quantity of the payload data of the broadcast services.

The use of LTE-A as transmission standard for the redundancy data allows for the integration of evolved Multimedia Broadcast Multicast Service, eMBMS, as an additional transmission layer. eMBMS is a broadcast extension of LTE-A used within the traditional infrastructure of LTE-A broadband cellular networks. Using eMBMS, redundancy data can be broadcasted within at least one of the second coverage areas 15.1-15.2 to enhance the first coverage area 14 of the broadcast network.

Instead of transmitting user specific redundancy data in unicast (as it is made in HARQ, and in unicast RoD by default), a "common" RoD transmission mode can be used according to the invention, for example using eMBMS resources, in an area of the first coverage area 14 where the coverage by the HTHP transmitter 10 is not sufficient, so as to improve the reception quality regionally. The common RoD transmission mode corresponds to a broadcast mode that is triggered by the reception of requests for redundancy data from e user equipments.

According to the "common" RoD transmission mode, the redundancy data can be redundancy data that is obtained according to a predetermined rule, (random or predetermined approach) or can be redundancy data that is obtained based on the missing data identified in the requests for redundancy data of user equipments (waterfilling).

For example, redundancy data can be obtained for being broadcasted in eMBMS based on specific data requested by UEs via retransmission requests. This common RoD retransmission mode can therefore correspond to a waterfilling method. Also, tests have proven that the redundancy data does not necessarily has to be the specific missing or corrupt data, but redundancy data can be obtained based on a predetermined rule and can be transmitted by an eNodeB to a plurality of UEs, only causing a minor efficiency reduction compared to the waterfilling method. The predetermined rule can for example be to select bits of the original broadcast transmission that are the Least Significant Bits (LSBs) or bits that are spread evenly within the transmission spectrum so as to mitigate the fading effects. The amount of redundancy data can also be predetermined or can vary dynamically as explained hereafter.

In addition, as previously explained, redundancy data obtained based on a predetermined rule can be broadcasted preemptively, according to the pre-emptive RoD transmission mode. Then the redundancy data can be broadcasted by the nodes 11.1 and 11.2 continuously, in parallel to the broadcasting of the broadcast services by the HTHP transmitter 10, without waiting for the reception of requests for redundancy data. The pre-emptive RoD transmission mode is therefore distinguished from the predetermined approach of the common RoD transmission mode, in that it is not triggered by a prior reception of requests by user equipments.

Therefore, instead of fully retransmitting broadcast services via eMBMS in coverage gaps of the wide first coverage area 14, common or pre-emptive RoD transmission modes can be used to fill the coverage gaps.

Based on the number of UEs within a second coverage area 15.1 or 15.2 of a given node (eNodeB) 11.1 or 11.2, the eNodeB (or the RoD server 12 depending on the embodiment) may not only chose between unicast transmission modes such as unicast RoD and HARQ, but can also increase the transmission efficiency by using eMBMS to provide RoD as a broadcast service.

To provide individual RoD data to the UEs (for the unicast RoD transmission mode), the UEs need to request redundancy data via requests for redundancy data. The broadband network can also address the requests using the common RoD transmission mode, according to the waterfilling approach.

The pre-emptive RoD transmission mode can be selected without receiving requests for redundancy data from the UEs and the predetermined approach of the common RoD transmission mode does not take into account the missing data that is identified by the requests for redundancy data from the user equipments. Indeed, for the pre-emptive RoD transmission mode, an upper limit of redundancy data for the UEs can be calculated for a given second coverage area of an eNodeB, and the upper limit of redundancy data can be broadcasted in the given coverage area, via eMBMS for example.

This upper limit can also be used for the predetermined approach of the common RoD transmission mode.

The requests for redundancy data may contain at least one of the following elements:
  information relating to an amount of required redundancy data;
  an identifier of the requested data, for example an identifier of a Forward Error Coding, FEC, frame for which redundancy data is requested; and
  a location identifier of the given user equipment. This enables to optimize the provision of redundancy data. The location identifier can comprise the geographical position of the requesting UE (via Global Positioning System, GPS, for example) or an identifier of the eNodeB currently serving the requesting UE.

The redundancy data can be determined, by the serving eNodeB 11.1 or 11.2 or by the RoD server 12, based on at least one of the above elements, or based on a combination of elements from different requests for redundancy data issued from different UEs.

For example, when several requests for redundancy data are received from different UEs served by a given eNodeB, an upper limit can be easily determined by determining the highest amount of required redundancy data among the requested amounts.

According to some prior art techniques, some RoD methods propose to use Mutual Information, MI, of the signal received by the UE to provide a quality metric that can be used to estimate the amount of required redundancy data.

To reduce the computational complexity of the determination of the amount of required redundancy data, it can be estimated using quality measures such as the input power level. No restriction is attached to the specific calculation that can be used for determining the amount of required redundancy data based on the input power level. The lower the input power level, the higher the amount of required redundancy data should be. The amount of required redundancy data can therefore be directly and easily calculated by the UE. In that case, information related to an amount of required redundancy data corresponds to the amount of required redundancy data. Alternatively, the serving node (eNodeB) can calculate the amount of required data, based on a CQI reported by the UE for example (in that case, the information related to an amount of required redundancy data is the CQI). CQI, Channel Quality Indicator, is defined in LTE as an indicator carrying information on the quality of the communication channel.

This embodiment is less accurate than using the MI and it requires a larger "safety margin" (meaning that the amount of required redundancy data will be necessarily overestimated). However, in the event where the common RoD transmission mode (waterfilling approach as the random approach does not take the UE requests into account) is selected, an overestimation of the amount of required redundancy data by each of the requesting UEs is less critical as an overprovision of redundancy data is natively implied by the use of the multicast mode, as some UEs will require more redundancy data than others.

Alternatively, for the pre-emptive RoD transmission mode and for the predetermined approach, the redundancy data can be obtained according to a predetermined rule, and the amount of redundancy data can be predetermined or dynamically calculated.

For example, the pre-emptive RoD transmission mode can be selected in a given broadband network cell or area based on a network planning of the broadcast network, because of known coverage issues by the broadcast network. A predetermined amount of redundancy data can be obtained in that case.

The predetermined approach for the common RoD transmission mode can be selected when a number of requests for redundancy data exceeds a predetermined threshold for a given broadband cell or area. Then, an upper bound of the requested RoD data can be determined, creating an over-provisioning for UEs with better reception, but while saving transmission capacity because of the use of broadcast technology within the broadband network.

For both the pre-emptive RoD transmission mode and for the predetermined approach, the amount of redundancy data can then be adapted over time, based on requests for redundancy data from the user equipments.

In the prior art, it is generally assumed that the broadband connection is errorless and available to provide redundancy data to the UEs. However, the transmission via mobile broadband connections is also prone to transmission errors caused for example by insufficient coverage, fading effects, etc. If decoding by the UE using the redundancy data transmitted via broadcast (pre-emptive RoD transmission mode or common RoD transmission mode for example) fails, the UE may request retransmission of the redundancy data (via a request for retransmission of redundancy data for example) or even retransmission of the complete payload data (via HARQ for example). The UE can therefore force the eNodeB to retransmit redundancy data, using the same transmission mode as previously, or using another (more robust) transmission mode such as unicast RoD or HARQ.

Requesting retransmission of redundancy data, after a first transmission of redundancy data, of course introduces delay in the decoding process by the UE. Therefore, the process of retransmitting redundancy data via unicast RoD or HARQ is especially useful when the initial transmission of redundancy data was a broadcast mode, in particular the pre-emptive RoD transmission mode or common RoD transmission mode, via eMBMS for example, for which the delay is smaller.

Another aspect of the network system according to the invention is how the additional redundancy data can be used within the UEs. The original concept of RoD for DVB-T2 proposes to transmit the least robust information provided by the QAM constellation points of the original encoded data (broadcast service), which the UE uses to replace the original data received over the broadcast connection. This concept can also be used within the framework of the invention. According to the present invention, and as already explained above, other options are possible when providing RoD redundancy data: LTE-A+ frames transmitted by the HTHP transmitter 10 can use Turbo Codes as FEC (instead of LDPC in case of DVB-T2), the redundancy data can be used for the decoding process as additional extrinsic information, supporting the decoding process of the QAM symbols received via broadcast, instead of replacing them.

To summarize, the present invention therefore enables a flexible redundancy data transmission method that can alternate between several modes such as:
  HARQ retransmission mode (unicast). In that retransmission mode, the whole payload of the missing FEC frame is retransmitted in unicast to the requesting UE;

unicast RoD retransmission mode. Compared to HARQ, the amount of redundancy data is less and the nature of the redundancy data is different, as already explained;

common RoD retransmission mode (broadcast): several UEs are addressed via broadcasted redundancy data. According to the waterfilling approach, requests of several UEs served by a common eNodeB are taken into account to determine the amount of redundancy data to be broadcasted. According to the predetermined approach, redundancy data is based on a predetermined rule to be broadcasted to the UEs. This mode can be selected when a number of retransmission requests received by a given eNodeB exceeds a predetermined threshold for example. The redundancy data can be transmitted via eMBMS according to this retransmission mode;

pre-emptive RoD retransmission mode: this mode does not require reception of retransmission requests from the UE and is based on redundancy data obtained based on a predetermined rule. Latency of this retransmission mode is very short as random redundancy data can be broadcasted in parallel to the original transmission of the broadcast services by the HTHP transmitter 10. The redundancy data can be transmitted via eMBMS according to this retransmission mode.

These modes are given for illustrative purposes and the present invention also encompasses selection of modes others than the above illustrative retransmission modes. As explained, a first mode can be selected for transmission of redundancy data, and, upon reception of a request for retransmission of redundancy data, a second mode, preferably more robust than the first mode, can be selected for retransmission of redundancy data.

Figure 4:
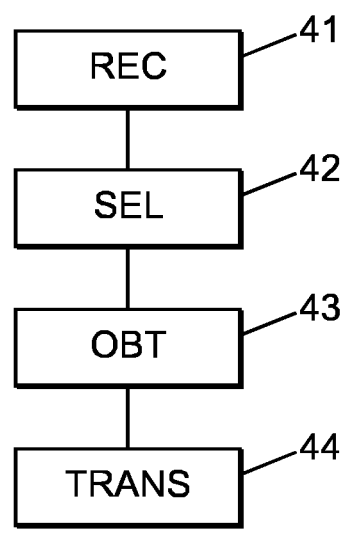
FIG. 4 is a flowchart illustrating the steps of a method according to some embodiments of the invention.

FIG. 4 is a flowchart illustrating the steps of a method according to a general embodiment of the invention. This method can be performed by at least one network entity of the broadband network, which can be the base station 11, the RoD server 12 or a combination thereof.

At step 41, which is optional as explained above, at least one request for redundancy data is received from at least one UE. The request for redundancy data is received by the node serving the requesting UE and can be optionally transmitted to the RoD server 12. When forwarding the request for redundancy data to the RoD server, the serving node can enrich the request with an identifier of the serving node, which is advantageous when the original request for redundancy data issued by the UE does not comprise a location identifier such as GPS coordinates.

At step 42, a transmission mode for redundancy data is selected among a plurality of retransmission modes supported by the broadband network. As explained above, the transmission mode can be selected by the RoD server 12 or by the serving node, depending on the embodiment. As explained above, a transmission mode can define the redundancy data (the nature of the redundancy data), the way of transmitting the redundancy data, or a combination thereof.

At step 43, the redundancy data is obtained, by the RoD server 12, by the serving node from an internal database.

It can also be calculated from the original broadcasted date or during the creation/coding of the original broadcasted data by the broadcast network.

Redundancy data comprises information for decoding broadcast services broadcasted by the broadcast network. The redundancy data can be determined based on the selected transmission mode, or independently. For example, in the event where the selected transmission mode only defines the way redundancy data is transmitted (for example unicast or broadcast), the redundancy data needs to be selected independently. No restriction is attached to the obtaining of redundancy data independently from the selected transmission mode: for example, the amount of redundancy data can depend on the broadband network load. In case of broadband network overload, transmission of a low amount of redundancy data can be preferred to transmission of the whole payload.

At step 44, the obtained redundancy data is transmitted at least one node of the broadband network, according to the selected transmission mode.

Figure 5:
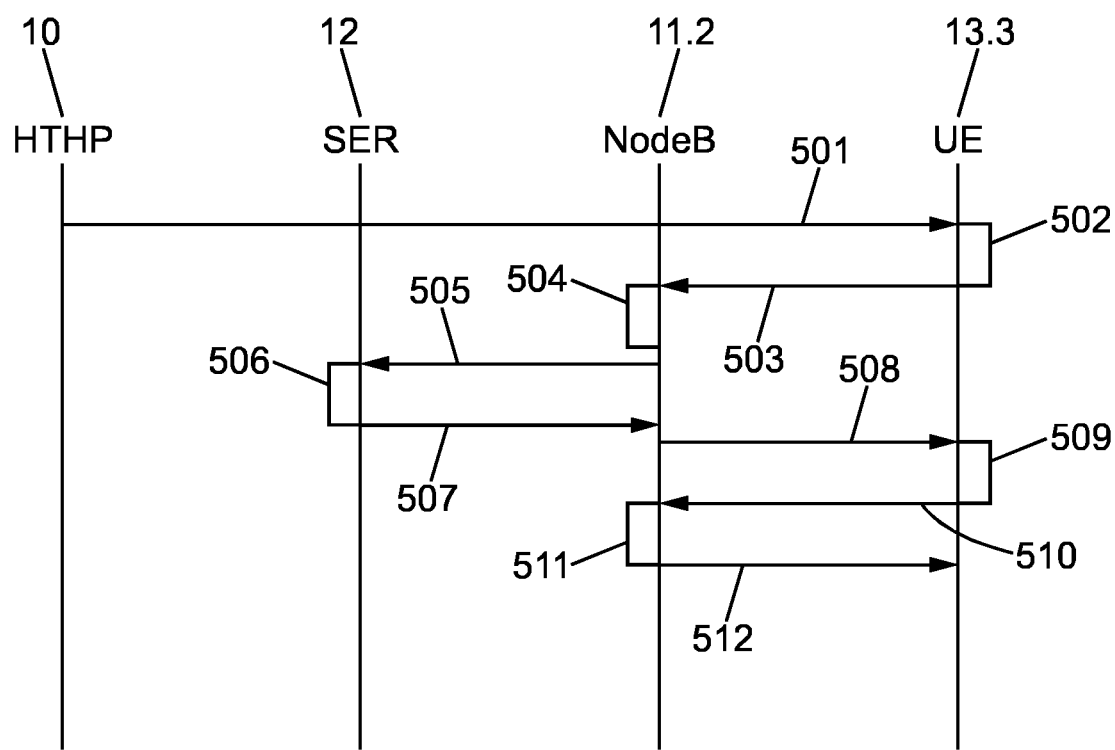
FIG. 5 illustrates an exchange diagram between the entities illustrated on FIG. 1, according to some embodiments of the invention.

FIG. 5 illustrates an exchange diagram between the entities of the network system shown on FIG. 1, according to some embodiments of the invention. FIG. 5 illustrates a specific embodiment within the framework of the general embodiment of FIG. 4. The specific embodiment of FIG. 5 is given for illustrative purposes and the invention is not restricted to this specific embodiment.

At step 501, a LTE-A+ FEC frame is broadcasted from the HTHP transmitter 10 and received by the UE 13.3 for example.

At step 502, the UE 13.3 attempts to decode the FEC frame. However, due to error on the broadcast channel for example, the UE 13.3 fails to decode the FEC frame, or at least a portion of the FEC frame (for example least signification bits of a QAM constellation points which are less robust). At step 502, the UE 13.3 therefore generates a request for redundancy data, the request comprising information related to the amount of required redundancy data (which can be estimated by the UE 13.3 as explained above), an identifier of the requested data, such as an identifier of the FEC frame (which can be extracted from the received FEC frame or can be deduced otherwise) and optionally a location identifier such as GPS coordinates.

It is considered the UE 13.3 is already synchronized with the serving eNodeB 11.2, for example because the UE 13.3 also uses the broadband network for voice or data communications.

At step 503, the UE 13.3 sends the request for redundancy data to the serving eNodeB 11.2.

Upon reception of the request for redundancy data, the eNodeB 11.2 can select, at step 504, a transmission mode for transmitting redundancy data. For example, if only one UE (of few UEs) is requesting redundancy data, the unicast RoD transmission mode or the HARQ transmission mode can be selected. Alternatively, if several UEs (more than a predefined threshold for example) are requesting redundancy data, the UE can select a common RoD transmission mode.

At step 505, the eNodeB 11.1 requests redundancy data to the RoD server 12. To this end, it can for example indicate the selected transmission mode, which can affect the redundancy data: for example, for HARQ, the whole payload of the FEC frame is used as redundancy data whereas only certain QAM constellation points are used as redundancy data under RoD.

At step 506, redundancy data is obtained by the RoD server, and transmitted to the eNodeB at step 507

In the specific embodiment described above, we assume that the eNodeB 11.2 selects the common RoD transmission mode. As explained before, the selection step can be alternatively performed by the RoD server 12 and in that case, the request for redundancy data is forwarded by the eNodeB 11.2 to the RoD server 12 at step 505 and the transmission mode is selected by the RoD server 12 at step 506, during the step of obtaining the redundancy data.

At step 508, the obtained redundancy data is transmitted by the eNodeB according to the selected transmission mode.

In the specific embodiment considered with reference to FIG. 5, the redundancy data is broadcasted (because the common RoD transmission mode has been selected), via eMBMS for example.

Upon reception of the redundancy data, the UE 13.3 may attempt again to decode the LTE-A+ FEC frame received at step 501, using the redundancy data received at step 508.

According to the specific embodiment illustrated on FIG. 5, the UE 13.3 fails again to decode the LTE-A+ FEC frame.

Therefore, a request for retransmission of redundancy data can be sent at step 510. The retransmission request may comprise the same elements as the transmission request initially generated at step 502. In addition, it can comprise an identifier that redundancy data is requested for the second time for the identified FEC frame.

Upon reception of the retransmission request, the eNodeB 11.2 can reselect a transmission mode at step 511: it can for example reselect the same transmission mode, that is, the common RoD transmission mode, in particular if several UEs have sent a retransmission request. However, it is preferable to use a more robust transmission mode such as HARQ or unicast RoD transmission modes.

After reselection of a transmission mode, redundancy data is transmitted at step 512 in accordance with the reselected transmission mode.

Figure 6:
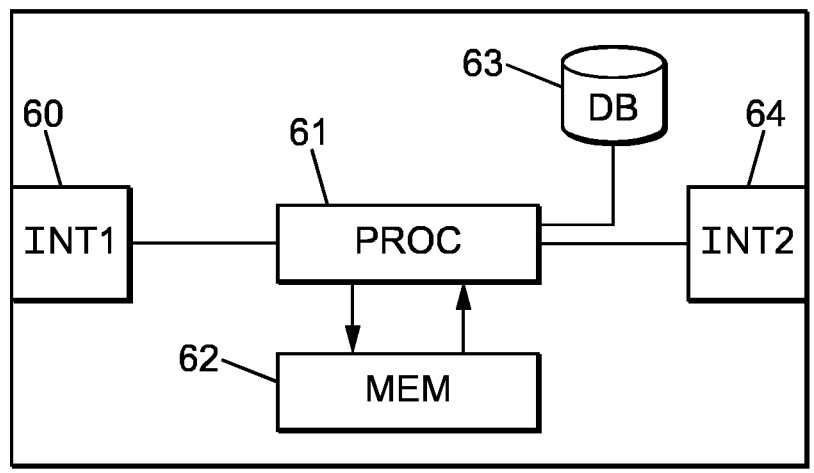
FIG. 6 illustrates a structure of a network entity according to some embodiments of the invention.

FIG. 6 illustrates a network entity of a broadband network of a hybrid network system according to some embodiments of the invention.

The network entity comprises a random access memory 62 and a processor 61 that can store instructions to perform the steps of the method as illustrated on FIG. 4.

The network entity also comprises a database 63. The database 63, according to some embodiments can store redundancy data, or several sets of redundancy data corresponding to respective transmission modes. Alternatively, the database 63 only stores the FEC frames broadcasted by the HTHP transmitter 10 and the redundant data can be calculated on the fly based on the selected transmission mode, and based on additional transmission parameters (for example a maximum available rate for transmitting the redundancy data). Database 63 may also store rules (such as threshold values) that can enable to select a transmission mode. The database 63 may also store a dynamic table listing the UEs that are served by a given eNodeB at a given time.

The network entity may further comprise a first network interface 60 for communicating with the UEs. According to the LTE-A, this interface is an antenna or a set of antennas for exchanging wireless signals with UEs in the second coverage areas.

The network entity may further comprise a second network interface 64 for communicating with other entities of the broadband network. For example, in the case where the network entity is the eNodeB, the second network interface 64 enables to communicate with the RoD server 12.

As described above, the network entity can be the RoD server 12 or one of the nodes 11.1-11.2. As explained above, the network entity can also be split between the RoD server 12 and the node 11.1 or 11.2. For example, the RoD server comprises a first processor and the node comprises a second processor, and the first and second processors together are configured to perform the steps performed by the processor 61 described above.

Figure 7:
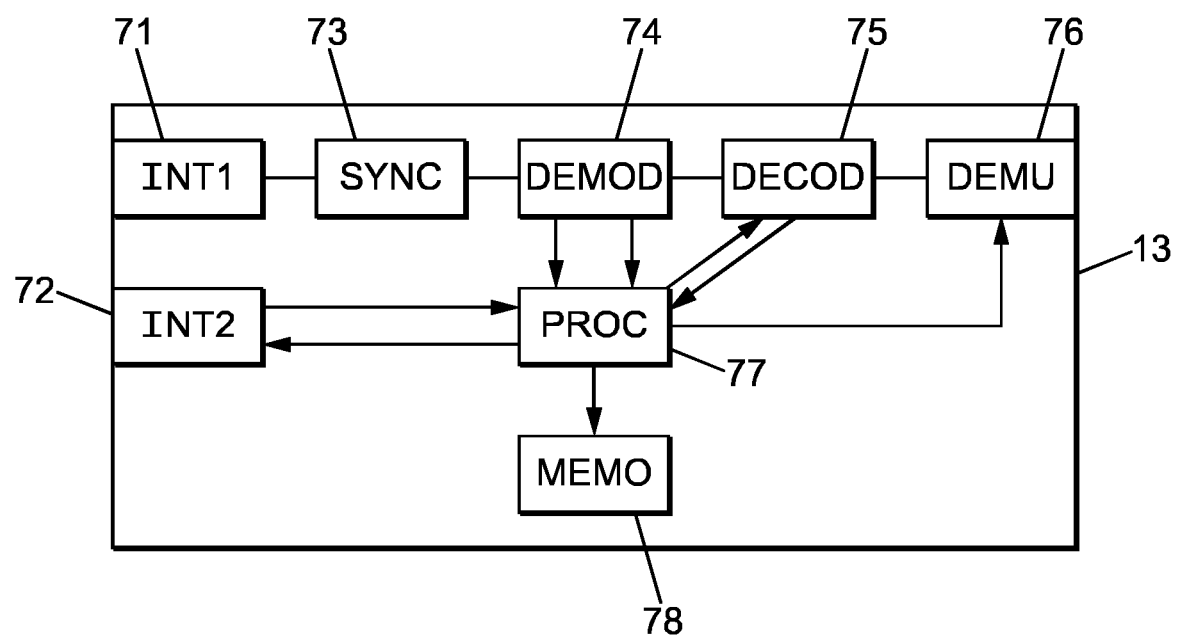
FIG. 7 illustrates a structure of a user equipment according to some embodiments of the invention.

FIG. 7 illustrates a detailed structure of a UE 13 according to some embodiments of the invention.

The UE 13 comprises a first interface 71, which is arranged to receive radiofrequency signals broadcasted by the HTHP transmitter 10. The first interface 71 can therefore be an antenna.

The UE 13 also comprises a synchronization unit 73, a demodulation unit 74 and a channel decoding unit 75 and a de-multiplexing unit 76. These units are configured for decoding the FEC frames received via the first interface 71. As their functioning is well known, it is not further described in the present application.

The UE 13 further comprises a second interface 72 according to the invention. The second interface 72 is configured to access the broadband network, i.e. to communicate with the eNodeBs of the LTE-A network.

The UE 13 further comprises a processor 77 and a random access memory (RAM) 78, that are configured for performing at least some of steps 501, 502, 503, 508, 509, 510, 512 described when referring to FIG. 5. The processor 77 and the RAM 78 can in particular be configured for performing at least some of the operations below:

detecting that the units 73 to 76 fail to decode at least one of the FEC frames received by the first interface 71;
estimating a required amount of redundancy data, as explained above;
obtaining a geographical position of the UE 13;
generating requests for redundancy data or requests for retransmission of redundancy data as explained above;
forwarding redundancy data that is received by the second interface 72 to the units 73 to 76.

The invention claimed is:

1. A method for transmitting redundancy data in a hybrid broadband/broadcast network system comprising a broadcast network dedicated to transmission of broadcast services and a broadband network dedicated to transmission of at least unicast services, the method being carried out in at least one network entity and a base station of the broadband network and comprising the following steps:
    selecting by the network entity a transmission mode for transmitting redundancy data among a plurality of transmission modes supported by the broadband network;
    obtaining redundancy data, said redundancy data comprising information for decoding broadcast services broadcasted by the broadcast network;
    transmitting to at least one user equipment from the base station of the broadband network the obtained redundancy data according to the selected transmission mode;
    wherein the plurality of transmission modes comprises at least one pre-emptive redundancy on demand (RoD) mode according to which a quantity of redundancy data is only a fraction of a quantity of payload data of the broadcast services and the redundancy data is obtained according to a predetermined rule and, wherein the redundancy data is broadcasted by the base station of the broadband network;
    wherein an amount of redundancy data is adapted based on a number of requests for redundancy data received by the base station from user equipments in a coverage area of the base station.

2. The method according to claim 1, wherein the broadband network is an LTE-A network and wherein the broadcast network is configured to transmit LTE-A broadcast services.

3. The method according to claim 1, wherein, upon selection of one of the at least one broadcast transmission mode, the redundancy data is broadcasted via evolved Multimedia Broadcast Multicast Service (eMBMS).

4. The method according to claim 1, wherein the transmitted redundancy data depends on the selected transmission mode.

5. The method according to claim 1, wherein the plurality of transmission modes comprise at least a Hybrid Automatic Repeat Request mode according to LTE-A.

6. The method according to claim 1, further comprising receiving, by the at least one base station, at least one request for redundancy data originating from at least one user equipment.

7. The method according to claim 6, wherein each request for redundancy data received from a given user equipment comprises the following elements:
 information related to an amount of required redundancy data;
 an identifier of a Forward Error Coding (FEC) frame; and
 a location identifier of the given user equipment;
 and wherein the redundancy data is obtained, based on at least one of said elements.

8. The method according to claim 6, wherein the transmission mode is selected based on a number of requests for redundancy data received by said at least one base station.

9. The method according to claim 1, wherein the at least one RoD mode comprises a unicast RoD mode, and wherein, upon selection of the unicast RoD mode, the portion of payload is transmitted to the at least one user equipment in unicast by the at least one base station of the broadband network.

10. The method according to claim 1, wherein the at least one RoD mode comprises a common RoD mode, and wherein, upon selection of the common RoD mode, the portion of payload is broadcasted by the at least one base station of the broadband network.

11. A computer program comprising code instructions to implement the method according to claim 1 when said instructions are run by a processor.

12. A hybrid broadband/broadcast network system comprising a broadcast network dedicated to transmission of broadcast services and a broadband network dedicated to transmission of at least unicast services, the system comprising at least one network entity comprising a processor configured for:
 selecting a transmission mode for transmitting redundancy data among a plurality of retransmission modes supported by the broadband network;
 obtaining redundancy data, said redundancy data comprising information for decoding broadcast services broadcasted by the broadcast network;
 and a base station of the broadband network being configured for transmitting the obtained redundancy data according to the selected transmission mode;
 wherein the plurality of transmission modes comprises at least one pre-emptive redundancy on demand (RoD) mode according to which a quantity of redundancy data is only a fraction of a quantity of payload data of the broadcast services and the redundancy data is obtained according to a predetermined rule and, wherein the redundancy data is broadcasted by the base station of the broadband network;
 wherein an amount of redundancy data is adapted based on a number of requests for redundancy data received by the base station from user equipments in the coverage area of the base station.

13. A user equipment comprising:
 a first interface for receiving data of a broadcast service broadcasted by a broadcast network;
 at least one unit configured to decode the data of the broadcast services received by the first interface;
 a second interface for communicating with at least one base station of a broadband network;
 a processor configured for:
 detecting that the at least one unit fails to decode said data;
 determining an information relating to an amount of required redundancy data;
 generating a request for redundancy data identifying the at least one frame and comprising the information relating to an amount of required redundancy data;
 receiving from the base station redundancy data according to the request for redundancy and according to a transmission mode for transmitting redundancy data among a plurality of transmission modes;
 forwarding the redundancy data received by the second interface to the at least one unit;
 wherein the plurality of transmission modes comprises at least one pre-emptive RoD mode according to which a quantity of redundancy data is only a fraction of a quantity of the payload data of the broadcast services and the redundancy data is obtained according to a predetermined rule and, wherein the redundant data is broadcasted by the base station of the broadband network;
 wherein the amount of redundancy data is adapted based on a number of requests for redundancy data received by the base station from user equipments in the coverage area of the base station.

* * * * *